(12) United States Patent
Marchant

(10) Patent No.: US 6,515,239 B2
(45) Date of Patent: Feb. 4, 2003

(54) MOTIVATIONAL APPARATUS FOR CONTROLLING USE OF ELECTRONIC DEVICES AND METHOD OF USE

(76) Inventor: Gregory Brian Marchant, 6048 Eastbrook Dr., Tuscaloosa, AL (US) 35405

( * ) Notice: Subject to any disclaimer, the term of this patent is extended or adjusted under 35 U.S.C. 154(b) by 43 days.

(21) Appl. No.: 09/792,784

(22) Filed: Feb. 23, 2001

(65) Prior Publication Data

US 2002/0117384 A1 Aug. 29, 2002

(51) Int. Cl.[7] .................................. H01H 9/00
(52) U.S. Cl. ........................... 200/1 R; 307/113
(58) Field of Search ..................... 200/1 R, 42.01; 361/627–632, 622, 641–644, 647; 307/5, 565, 714, 16, 34, 114, 113

(56) References Cited

U.S. PATENT DOCUMENTS

| | | |
|---|---|---|
| 3,609,738 A | 9/1971 | Marte |
| 3,629,530 A | 12/1971 | Fischer |
| 3,760,120 A | 9/1973 | Moorehead |
| 3,924,085 A | 12/1975 | Stone |
| 4,482,789 A | 11/1984 | McVey |
| 5,182,465 A * | 1/1993 | Stanley ........................ 307/113 |
| 5,231,310 A | 7/1993 | Oh |
| 5,260,606 A * | 11/1993 | Young ........................ 307/113 |
| 5,444,772 A | 8/1995 | Coker |
| 5,457,600 A | 10/1995 | Campbell et al. |
| 5,502,760 A | 3/1996 | Gilbert et al. |
| 5,584,378 A | 12/1996 | Wecke et al. |

* cited by examiner

Primary Examiner—Elvin Enad
Assistant Examiner—Lisa Klaus
(74) Attorney, Agent, or Firm—Kenneth M. Bush; Bush IP Law Group

(57) ABSTRACT

A motivational apparatus for controlling use of an electronic device, wherein the apparatus is interconnected between a source of transmission (e.g. power) and the electronic device to control transfer of transmissions from the transmission source to the electronic device. The apparatus comprises a plurality of electrical switches, a master switch, and a plurality of light-emitting diodes. A list of tasks is prepared and associated with the electrical switches such that one task corresponds to one electrical switch. As each task is completed, the electrical switch corresponding to that task is actuated to light up the diode corresponding to that switch. After all of the tasks are completed, a parent or supervisor may confirm satisfactory completion of the tasks and then actuate the master switch to close the electrical circuit, thereby allowing transfer of transmissions from the transmission source to the electronic device such that the electronic device is operational.

4 Claims, 3 Drawing Sheets

MOTIVATIONAL APPARATUS FOR CONTROLLING USE OF ELECTRONIC DEVICES AND METHOD OF USE

FIELD OF THE INVENTION

The present invention relates generally to motivational development of desirable behavior. More particularly, the present invention relates to a motivational apparatus which allows use of an electronic device only after a predetermined number of tasks have been successfully completed.

BACKGROUND OF THE INVENTION

Attempts have been made in society to use motivational methods to achieve certain goals. Much of human behavior can be understood as being directed toward specific goals. Incentive motivation is concerned with the way goals influence behavior. One of the most important aspects of this type of motivation is that any goal one seeks can motivate behavior. For example, the goal of obtaining spending money can serve as a strong motivator for performing yard work.

Commonly, parents will require their children to perform tasks or "chores" in order to obtain privileges. The child's ability to obtain a privilege is typically made contingent on the performance of socially desirable acts, such as cleaning up one's bedroom, good personal hygiene, being obedient, and being generally respective of others.

In today's society, many of the privileges enjoyed by children are related to electronic devices, such as watching television, playing computer games, and talking on the telephone with friends. Making these privileges contingent on the performance of certain tasks would provide a strong motivation to perform these tasks, which, over a period of time, can develop socially desirable behavior and an appreciation for delayed gratification.

Accordingly, what is needed is an apparatus which promotes development of desirable behavior by providing a motivational apparatus which allows access to electronic devices only after a predetermined number of tasks have been successfully completed.

SUMMARY OF THE INVENTION

It is an object of the present invention to provide an apparatus for controlling use of electronic devices.

It is another object of the present invention to provide a motivational apparatus which allows use of an electronic device only after a predetermined number of tasks have been successfully completed.

It is another object of the present invention to provide a method for using the motivational apparatus.

These and other objects of the invention are accomplished with a motivational apparatus for controlling use of an electronic device, wherein the apparatus comprises means for interconnecting the apparatus between a source of transmission and the electronic device, and means for controlling transfer of transmissions from the transmission source to the electronic device. The transmissions may be electrical power from an AC or DC source, radio or video signals, analog or digital signals, or any other form of energy or information. The controlling means preferably comprises a plurality of electrical switches, a master switch, and a plurality of light-emitting diodes. Each of the electrical switches is preferably operable to open and close an electrical circuit to activate a diode to emit light and to open and close a portion of a master electrical circuit. The master switch, actuation of which is preferably restricted, is operable to open and close a portion of the master electrical circuit. The electrical switches must all be actuated to allow transfer of transmissions from the transmission source to the master switch, which, in turn, must be actuated to close the master circuit and thereby allow transfer of transmissions from the transmission source to the electronic device.

In operation, the apparatus is interconnected between the electronic device and the transmission source. A list of tasks is prepared and associated with the electrical switches such that one task corresponds to one electrical switch. As each task is successfully completed, the electrical switch corresponding to that task is actuated to light up the diode corresponding to that switch. After all of the tasks are completed, a parent or supervisor may confirm satisfactory completion of the tasks and then actuate the master switch to close the master circuit, thereby allowing transfer of transmissions from the transmission source to the electronic device such that the electronic device is operational.

Other features, objects and advantages of the present invention will become apparent from a reading of the following description as well as a study of the appended drawings.

BRIEF DESCRIPTION OF THE DRAWINGS

An apparatus incorporating features of the invention is depicted in the attached drawings which form a portion of the disclosure and wherein.

DESCRIPTION OF THE PREFERRED EMBODIMENTS

Figures 1A, 1B:
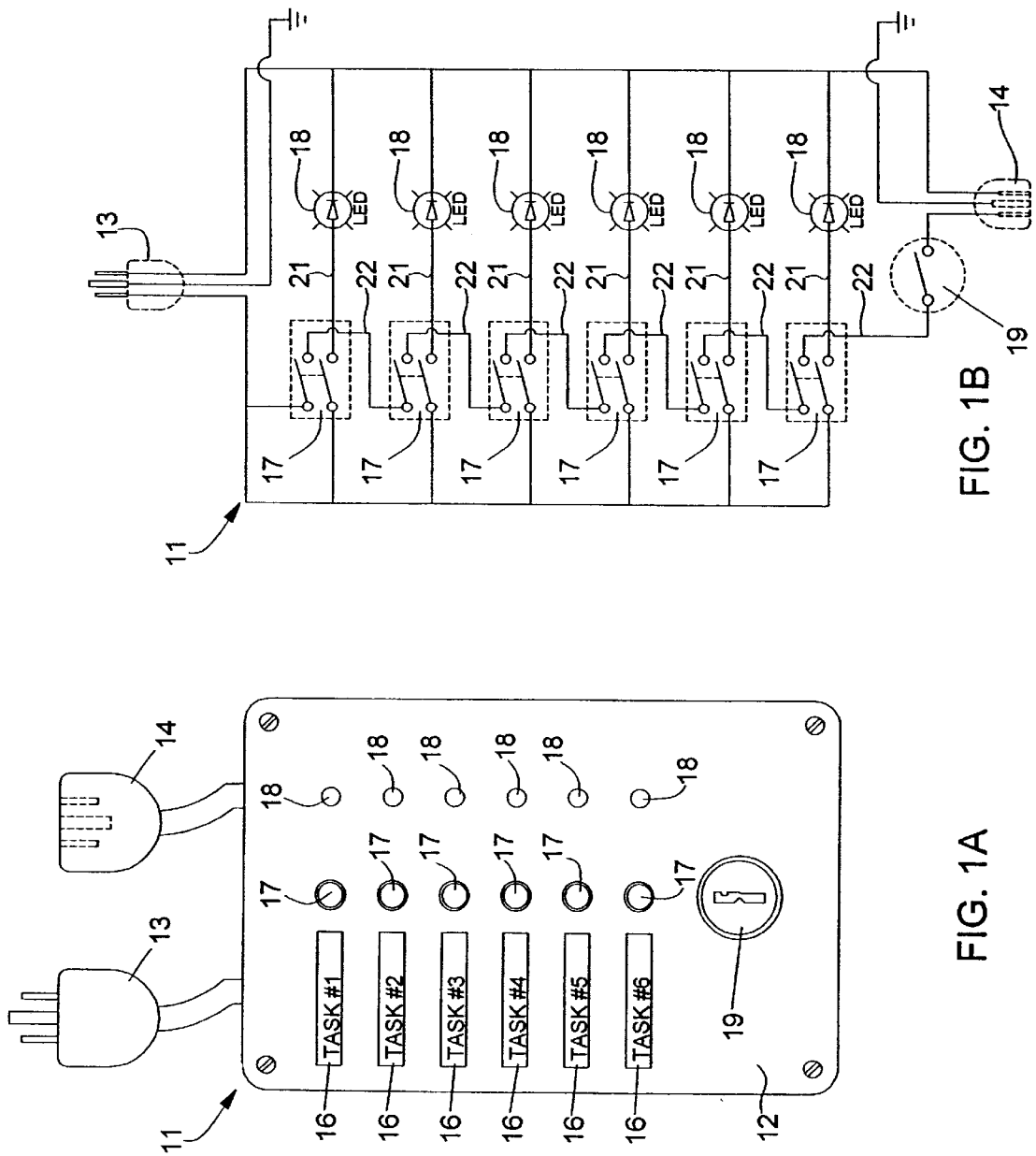
FIG. 1A is a plan view of the preferred embodiment of the present invention.
FIG. 1B is an electrical schematic view of the embodiment of FIG. 1A.

Referring to the drawings for a better understanding of the function and structure of the present invention, FIGS. 1A and 1B illustrate the embodiment of the present invention designed to control transfer of power from a power source (not shown) to an electronic device, such as a radio, television, computer, etc. The motivational apparatus 11 comprises a housing 12, a power plug 13 for connecting the apparatus 11 to a power source, such as an electrical outlet, and a socket 14 for receiving a power plug from the electronic device (not shown). The apparatus 11 preferably comprises a plurality of windows 16 for displaying a plurality of tasks. The windows 16 may be designed to display the tasks in either written or electronic form.

The motivational apparatus 11 may further comprise a plurality of electrical switches 17, a plurality of light-emitting diodes 18, and a master switch 19. Each of the electrical switches 17 is preferably a double-pole single-throw (DPST) switch operable to open and close two circuits: an electrical circuit 21 which activates a diode 18 to emit light and a portion of a master electrical circuit 22. The master switch 19 may be operable to open and close a portion of the master electrical circuit 22. Actuation of the master switch 19 is preferably restricted by either key or private code access. The electrical switches 17 must all be actuated to allow transfer of power from the power source to the master switch 19. The master switch 19, in turn, must be actuated to close the master circuit 22 to allow transfer of power from the power source to the electronic device.

In operation, the apparatus 11 is interconnected between the electronic device (not shown) and the power source (not shown). A plurality of tasks may be written down or electronically entered into the apparatus 11 such that the tasks are displayed in the windows 16. Each task may be associated with an electrical switch 17 such that as a task is completed, the electrical switch 17 corresponding to that task may be actuated to light up the diode 18 corresponding to that switch 17. After all of the tasks are completed, a parent or supervisor may confirm satisfactory completion of the tasks and then actuate the master switch 19 to close the master circuit 22, thereby allowing transfer of power from the power source to the electronic device such that the electronic device is operational. An optional timer may be included such that after a predetermined period of time has elapsed the timer will open the master circuit 22, thereby discontinuing the transfer of power from the power source to the electronic device.

Figure 2B:
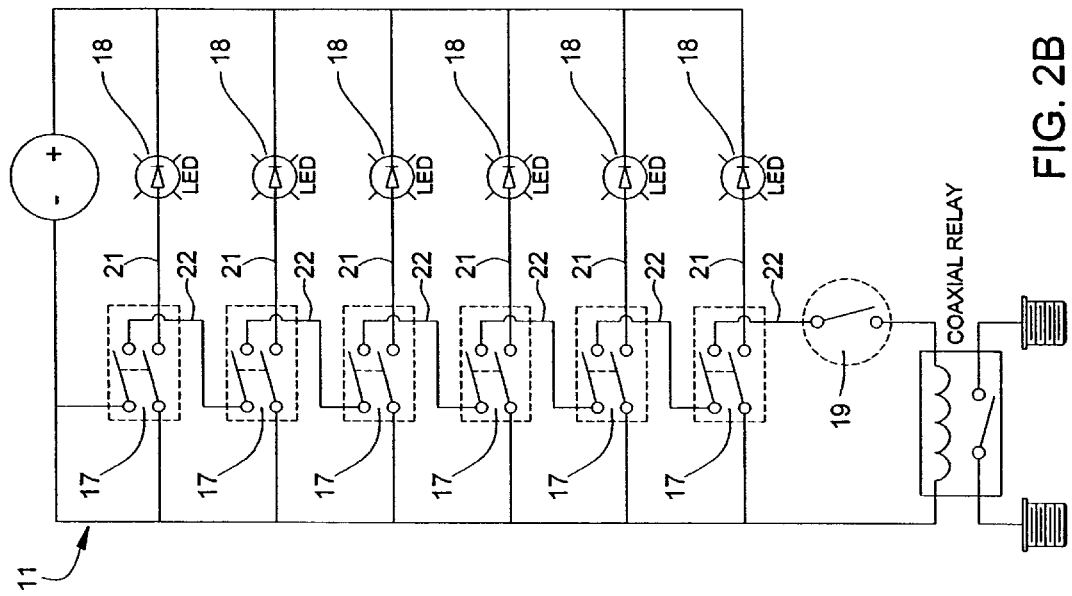
FIG. 2B is an electrical schematic view of the embodiment of FIG. 2A.
Figure 2A:
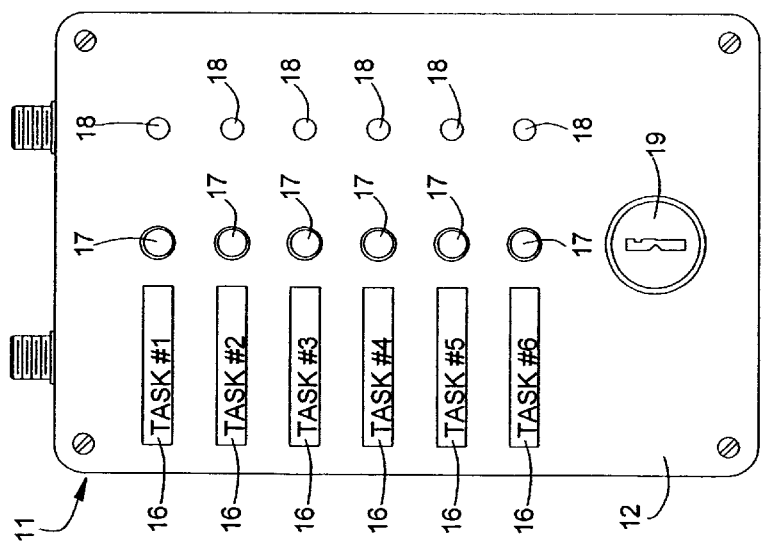
FIG. 2A is a plan view of an alternate embodiment of the present invention.
Figure 3B:
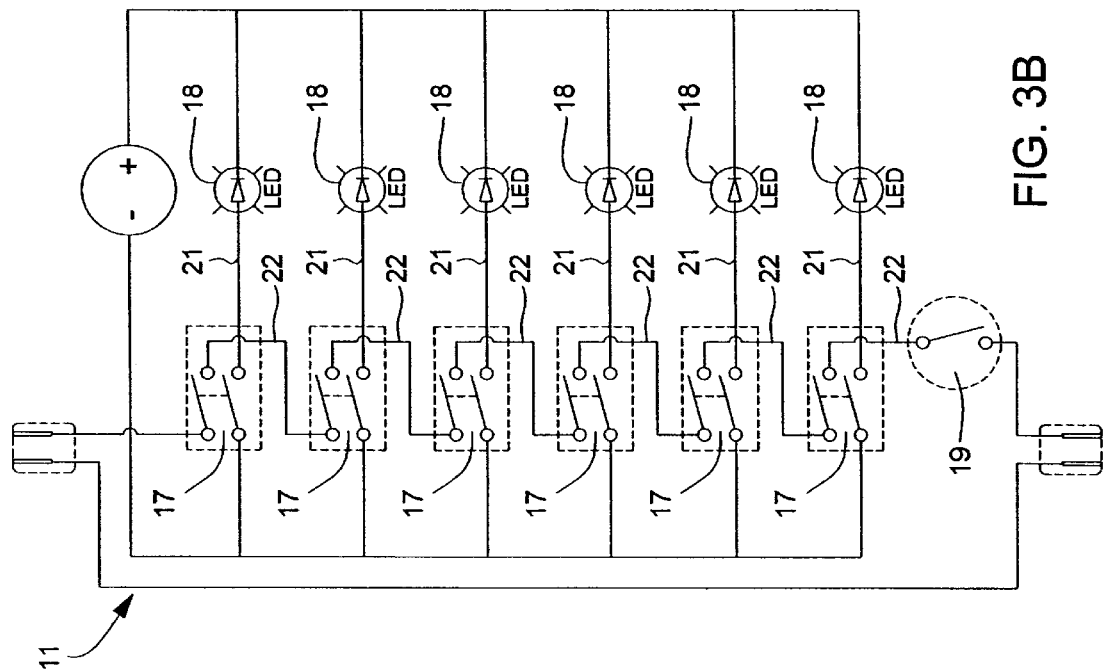
FIG. 3B is an electrical schematic view of the embodiment of FIG. 3A.
Figure 3A:
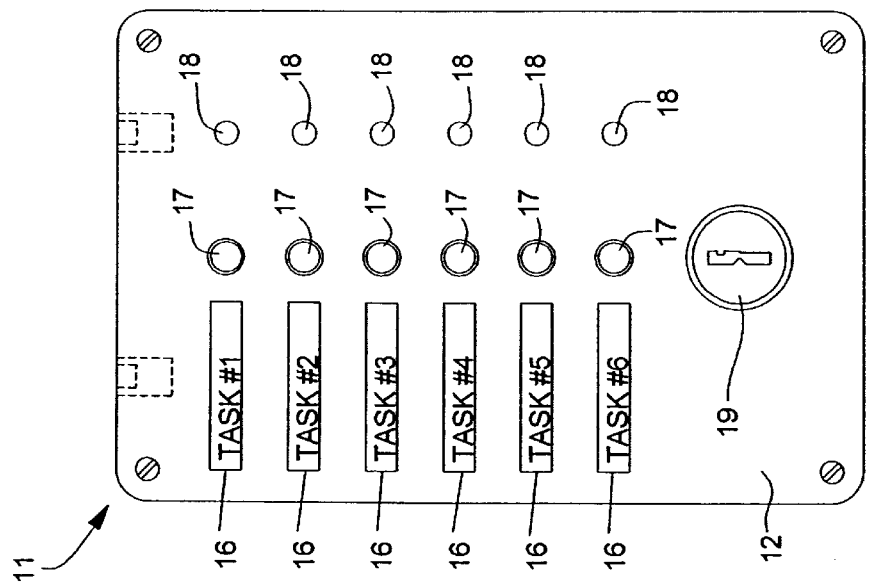
FIG. 3A is a plan view of another alternate embodiment of the present invention.

Alternate embodiments of the present invention may be designed to control transfer of any type of transmission to or from the electronic device. For example, the transmissions may be electrical power from any AC or DC source, radio or video signals, analog or digital signals, or any other form of energy or information. FIGS. 2A and 2B show an embodiment designed to control transfer of signals to or from a coaxial cable and FIGS. 3A and 3B show an embodiment designed to control transfer of signals to or from a telephone line. It is anticipated that the present invention could be used as a security apparatus to allow access to or use of sensitive equipment only after a predetermined number of tasks have been successfully completed in a manner similar to that described above. It is also anticipated that the present invention could be modified to control use of appliances or machinery, as well as to control access to restricted areas.

It is to be understood that the forms of the invention shown are preferred embodiments thereof and that various changes and modifications may be made therein without departing from the spirit of the invention or scope as defined in the following claims.

What is claimed is:

1. A method for motivating behavior by controlling use of an electronic device, comprising the steps of:
  a. interconnecting means for controlling transfer of transmissions between a source of transmission and the electronic device, wherein said means for controlling comprises a plurality of electrical switches operable to open and close a plurality of portions of an electrical circuit, wherein each of said switches is operable to open and close a portion of said electrical circuit, wherein all of said electrical switches must be actuated to close all of said portions of said electrical circuit to allow transfer of transmissions between the transmission source and the electronic device;
  b. preparing a list comprising a plurality of tasks;
  c. associating said tasks with said electrical switches such that each of said tasks corresponds to an electrical switch;
  d. performing each of said tasks; and
  e. actuating said electrical switches to close said portions of said electrical circuit corresponding to said switches as said tasks corresponding to said switches are completed, thereby allowing transfer of transmissions between the transmission source and the electronic device after all of said tasks are completed and all of said electrical switches are actuated to close said electrical circuit.

2. A method according to claim 1, further comprising the step of opening said electrical circuit to discontinue transfer of transmissions between the transmission source and the electronic device, wherein said opening step is achieved with a timer in electrical communication with said electrical circuit, wherein said timer is programmable to open said electrical circuit after a predetermined period of time.

3. A method for motivating behavior by controlling use of an electronic device, comprising the steps of:
  a. interconnecting means for controlling transfer of transmissions between a source of transmission and the electronic device, wherein said means for controlling comprises a plurality of electrical switches operable to open and close a plurality of electrical circuits to activate a plurality of light-emitting diodes and to open and close a plurality of portions of a master electrical circuit, and a master switch operable to open and close a master portion of said master electrical circuit, wherein each of said electrical switches is operable to open and close an electrical circuit to activate a light-emitting diode and to open and close a portion of said master electrical circuit, wherein all of said electrical switches must be actuated to close all of said portions of said master electrical circuit to allow transfer of transmissions between the transmission source and said master switch, and said master switch must be actuated to close said master portion of said master electrical circuit to allow transfer of transmissions between the transmission source and the electronic device;
  b. preparing a list comprising a plurality of tasks;
  c. associating said tasks with said electrical switches such that each of said tasks corresponds to an electrical switch;
  d. performing each of said tasks;
  e. actuating said electrical switches to close said electrical circuits corresponding to said switches as said tasks corresponding to said switches are completed, thereby activating said diodes corresponding to said switches to emit light, and to close said portions of said master electrical circuit corresponding to said switches; and
  f. actuating said master switch to close said master electrical circuit after all of said tasks are completed and all of said electrical switches are actuated to close said portions of said master electrical circuit, thereby allowing transfer of transmissions between the transmission source and the electronic device.

4. A method according to claim 3, wherein actuation of said master switch is restricted.

* * * * *